United States Patent
Yi et al.

(10) Patent No.: US 8,467,190 B2
(45) Date of Patent: Jun. 18, 2013

(54) BALANCED COOLING SYSTEM AND METHOD FOR HIGH-DENSITY STACKED CAGES

(75) Inventors: Robert Yi, San Jose, CA (US); Paul Yu, Mountain View, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 185 days.

(21) Appl. No.: 13/084,505

(22) Filed: Apr. 11, 2011

(65) Prior Publication Data

US 2012/0257355 A1   Oct. 11, 2012

(51) Int. Cl.
*H05K 7/20*   (2006.01)

(52) U.S. Cl.
USPC .......... 361/704; 361/679.46; 361/679.54; 361/690; 361/709; 439/341; 439/485; 439/607.2; 439/607.28

(58) Field of Classification Search
USPC .......... 361/679.46–679.5, 654, 690–697, 361/702–714, 715–728, 816, 818, 831; 454/184; 174/50.52, 520, 16.3; 165/80.3, 165/104.33, 185, 121–126; 312/223.2, 223.3; 385/53, 75, 88–92; 439/341, 485, 607.2, 439/607.28, 540.1, 541.5

See application file for complete search history.

(56) References Cited

U.S. PATENT DOCUMENTS

| | | |
|---|---|---|
| 3,626,251 A | 12/1971 | Vigue |
| 6,305,180 B1 | 10/2001 | Miller et al. |
| 6,558,191 B2 * | 5/2003 | Bright et al. ............... 439/541.5 |
| 6,731,519 B1 * | 5/2004 | Hwang ......................... 361/818 |
| 6,746,158 B2 | 6/2004 | Merrick |
| 6,762,940 B2 | 7/2004 | Zaremba |
| 6,854,894 B1 * | 2/2005 | Yunker et al. .................... 385/53 |
| 6,867,969 B2 * | 3/2005 | Hwang ......................... 361/690 |
| 6,916,122 B2 | 7/2005 | Branch et al. |
| 6,972,968 B2 * | 12/2005 | Hwang ......................... 361/818 |
| 6,980,437 B2 | 12/2005 | Bright |
| 7,044,777 B1 * | 5/2006 | Daly et al. ................. 439/540.1 |
| 7,059,887 B1 | 6/2006 | Liu |
| 7,070,446 B2 * | 7/2006 | Henry et al. ............... 439/541.5 |
| 7,178,996 B2 * | 2/2007 | Malagrino et al. .............. 385/92 |
| 7,255,490 B2 | 8/2007 | Zhang et al. |
| 7,275,959 B2 * | 10/2007 | Daly et al. ................ 439/607.2 |
| 7,322,854 B2 * | 1/2008 | Long et al. ............... 439/607.28 |
| 7,357,673 B2 * | 4/2008 | Long .......................... 439/607.2 |
| 7,371,965 B2 | 5/2008 | Ice |
| 7,410,307 B2 | 8/2008 | Sasser et al. |
| 7,539,018 B2 * | 5/2009 | Murr et al. ..................... 361/704 |
| 7,621,773 B2 | 11/2009 | Bright et al. |
| 7,764,504 B2 * | 7/2010 | Phillips et al. ................ 361/715 |
| 7,878,889 B2 | 2/2011 | Day |
| 7,951,650 B2 * | 5/2011 | Lima ........................... 438/122 |

(Continued)

*Primary Examiner* — Michail V Datskovskiy

(57) ABSTRACT

Systems and methods for balanced cooling of electrical systems, including electrical systems containing transceivers used in electrical and optical communication. An electrical system includes a cage, where the cage has a top, front and bottom. The cage contains a plurality of upper bays disposed in the front of the cage. Each of the plurality of upper bays is configured to receive a transceiver. The cage also contains a plurality of lower bays disposed in the front of the cage. Each of the lower bays is configured to receive a transceiver. Additionally, each of the plurality of upper bays is stacked on one of the plurality of lower bays. An upper heat sink extends from the outer surface of the top of the cage and a lower heat sink extends from the outer surface of the bottom of the cage.

20 Claims, 7 Drawing Sheets

U.S. PATENT DOCUMENTS

| | | | |
|---|---|---|---|
| 8,035,973 B2 * | 10/2011 | McColloch | 361/709 |
| 8,279,601 B2 * | 10/2012 | Lima et al. | 361/694 |
| 2002/0007643 A1 | 1/2002 | Spinazzola et al. | |
| 2005/0013126 A1 * | 1/2005 | Hwang | 361/818 |
| 2005/0037655 A1 * | 2/2005 | Henry et al. | 439/341 |
| 2005/0195571 A1 * | 9/2005 | Bulman-Fleming et al. | 361/704 |
| 2006/0126306 A1 | 6/2006 | Blair et al. | |
| 2007/0009213 A1 | 1/2007 | Meadowcroft et al. | |
| 2008/0285236 A1 * | 11/2008 | Phillips et al. | 361/709 |
| 2009/0202207 A1 | 8/2009 | Grzegorzewska et al. | |
| 2010/0067196 A1 * | 3/2010 | Costello et al. | 361/704 |
| 2011/0164382 A1 * | 7/2011 | Pirillis | 361/690 |
| 2011/0192587 A1 * | 8/2011 | Lima | 165/185 |
| 2012/0058670 A1 * | 3/2012 | Regnier et al. | 439/485 |
| 2012/0155108 A1 * | 6/2012 | Scholeno | 362/580 |
| 2012/0168122 A1 * | 7/2012 | Skepnek et al. | 165/80.2 |

* cited by examiner

BALANCED COOLING SYSTEM AND METHOD FOR HIGH-DENSITY STACKED CAGES

TECHNICAL FIELD

This invention relates generally to the field of transceiver systems. Exemplary embodiments relate to systems and methods for balanced cooling of high-density stacked cages used with transceivers, including cages used with transceivers for electrical and optical communications systems.

BACKGROUND

Fiber optics are widely used as a medium for transmitting voice and data signals. As a transmission medium, light provides advantages over traditional electrical communication techniques. For example, light signals allow for relatively high transmission rates as well as for transmission over great distances without signal loss, and light signals are resistant to electromagnetic interferences that can interfere with electrical signals.

Optical communications systems present a number of implementation challenges. For example, the data carried by light signal must be converted from an electrical signal to light at the sending device, and then converted from light back to an electrical signal at the receiving device. Thus, in an optical communication system, it is typically necessary to couple an optical fiber to an opto-electronic transmitter, receiver or transceiver device and to, in turn, couple the device to an electronic system such as a switching system or processing system.

These connections can be facilitated by modularizing the transceiver device used at both the sending and receiving device. Various transceiver module configurations are known for interfacing with a host device, such as a host computer, switching hub, network router, switch box, computer I/O and the like. For such implementations, it is standard for transceivers to be inserted into cages, such as, for example a stacked cage 10 shown in FIG. 1A. The cage 10 is a structure for receiving transceivers and comprises sides 12, top 16 and bottom 18 (not seen in view illustrated in FIG. 1). Additionally, the cage 10 includes a plurality of bays 14a, 14a', 14b, 14b'. The cage illustrated in FIG. 1A is a stacked cage, meaning that one set of bays 14a, 14a' is stacked on top of another set of bays 14b, 14b'.

The internal dimensions of the bays 14a, 14a' 14b, 14b' are typically standardized to the type of transceiver the cage 10 is meant to house, including for example, Small Form-Factor (SFF) or SFF-Pluggable (SFP) format. Additionally, more than one cage 10 can be used in a hub or network switch 20, as illustrated in FIG. 1B. FIG. 1B, illustrates a portion of a network switch 20, with a housing comprised of top 22, front face 24, sides 26, and bottom (not illustrated in FIG. 1B). The network switch 20 includes one or more cages 10, illustrated in FIG. 1B as one cage 10, with transceiver modules 16a, 16a' inserted into the upper bays 14a, 14a', and transceiver modules 16b, 16b' inserted into lower bays 14b, 14b'.

It is desirable to fit as many transceivers 16a, 16a', 16b, 16b' as possible into each cage 10, keeping in mind the need for each bay 14a, 14a', 14b, 14b' to be sized according to the standards for the applicable type of transceiver. Similarly, it is desirable to put as many cages 10 as possible into standard sized network switches 20. However, packing transceivers together so densely, especially as the transceiver size decreases and transceivers are stacked vertically as illustrated in FIGS. 1A and 1B, creates heat which can be detrimental to the performance of the transceivers. For instance, when the transceivers are optical transceivers, the optical elements and electrical components of the transceiver, such as light sources (e.g., lasers), light sensors, lenses and other optics, digital signal driver and receiver circuits, etc. of each transceiver must be kept below certain temperatures to ensure proper operation.

As the protocols used in optical networks increase in transmission speed, the heat generated by the transceivers typically increases, especially for smaller transceiver modules. For instance, 10-Gigabit transceivers generally require heat dissipation mechanisms. The heat emitted by the electronics and opto-electronics in transceivers 16a, 16a', 16b, 16b' such as that shown in FIG. 1B is commonly conducted away from transceivers by metallic portions of the cage 10 into which the transceivers are plugged. As illustrated in FIG. 2, cage 10 connectively coupled to a PCB board 30 may be inserted into a network switch 20 for use in an optical system. The network switch 20 can include apertures or openings in the rear 28 of the housing (or the housing of the network switch 20 may not have a rear cover) allowing air flow 32 to the back of and over the top surface 16 of the cage 10 in order to cool the cage 10 and dissipate the heat generated by the transceivers plugged into the cage 10 (not shown).

However, such systems are inefficient and do not equally cool the upper and lower transceivers in a stacked-cage 10. Such unequal cooling makes it difficult to properly regulate the temperature of all of the transceivers equally, and to know with any confidence that the transceivers inserted into the lower bays 14b, 14b' are being properly cooled to ensure efficient operation.

SUMMARY OF THE DISCLOSURE

Embodiments of the present invention relate to systems for balanced cooling of transceivers in high-density stacked cages. Methods of cooling are also provided. In an exemplary embodiment, an electrical system includes a cage, where the cage has a top, front and bottom. The cage contains a plurality of upper bays disposed in the front of the cage. Each of the plurality of upper bays is configured to receive a transceiver. The cage also contains a plurality of lower bays disposed in the front of the cage. Each of the lower bays is configured to receive a transceiver. Additionally, each of the plurality of upper bays is stacked on one of the plurality of lower bays. An upper heat sink extends from the outer surface of the top of the cage and a lower heat sink extends from the outer surface of the bottom of the cage.

An exemplary method includes providing a cage with a front, top, and bottom. The front of the cage containing a plurality of bays for receiving transceivers. A plurality of upper heat sinks extending from the outer surface of the top of the cage is provided. A plurality of lower heat sinks extending from the outer surface of the bottom of the cage is also provided. Air is then blown across the outer surface of the top of the cage and the outer surface of the bottom of the cage.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 3:
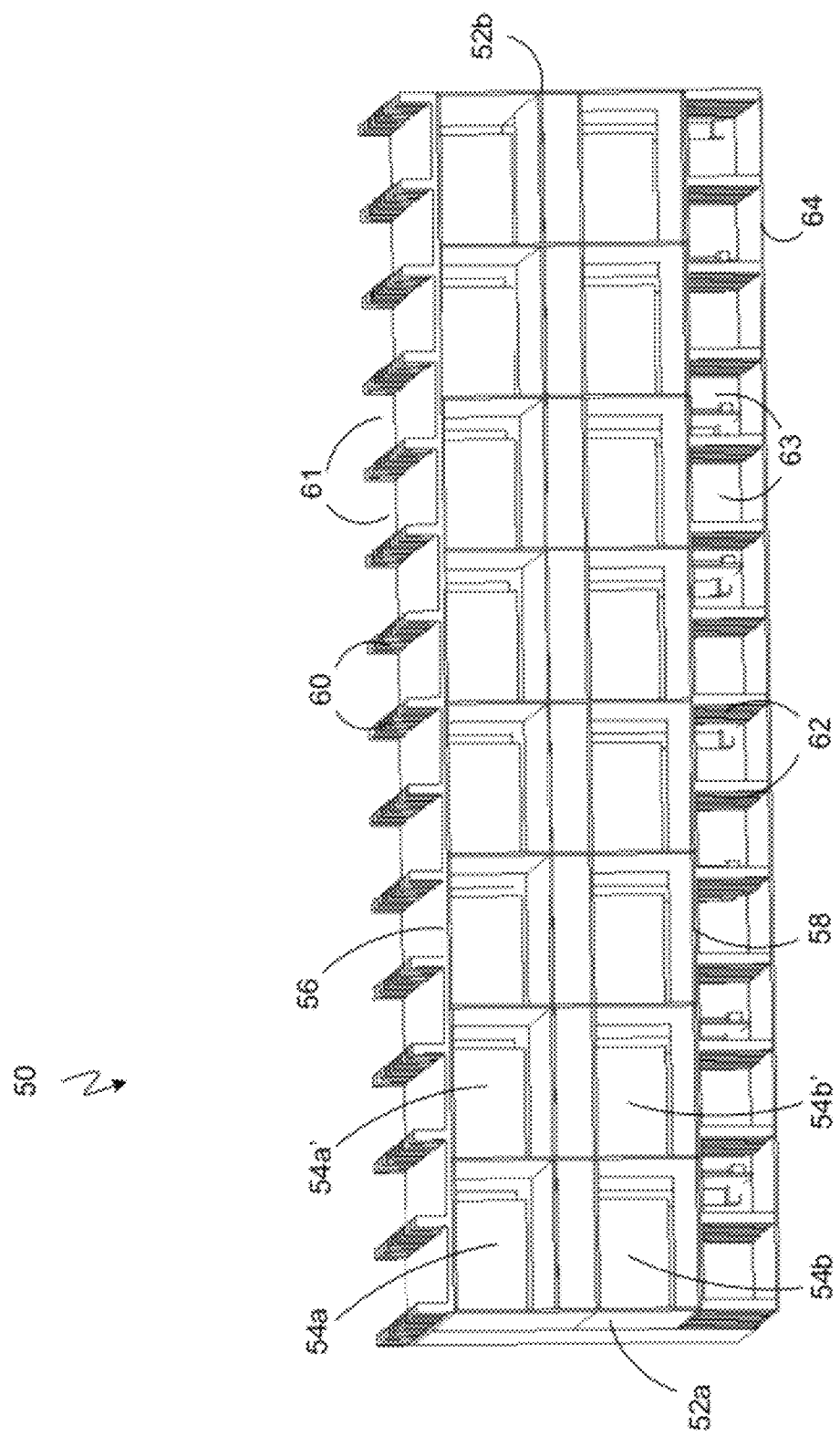
FIG. 3 is a front view of an exemplary embodiment of a cage for transceivers that allows for balanced cooling.

Referring initially to FIG. 3, an illustrative or exemplary embodiment of a cage 50 is shown. The exemplary cage 50 comprises a housing that includes sides 52a, 52b, top 56 and bottom 58. The housing may be made from any appropriate material such as sheet metal, but may be any other useful material, including a material useful for thermally conducting heat away from the components inserted in the cage 50, as discussed below. The front of the cage 50 includes a plurality of bays 54a, 54a', 54b, 54b' for receiving electrical or opto-electrical components, such as transceivers.

As shown in FIG. 3, each bay 54a, 54a', 54b, 54b' has a generally rectangular opening corresponding to the profile of the transceiver or other component which the cage is configured to receive. Similarly, the bays may be dimensioned so as to receive transceivers of a variety of types, including optical transceivers of any desired form factor, such as SFP, SFF, SFP+, QSFP, XFP, etc. Such optical transceivers will typically include electronic and optical components such as a light source (which may be a light-emitting diode or laser, such as a vertical-cavity surface-emitting laser (VCSEL)), a light receiver (which may be a photodiodes, such as a positive-intrinsic-negative (PIN) diode), and various circuits and circuit devices.

As illustrated in FIG. 3, the bays 54a 54a', 54b, 54b' are arranged in a stacked configuration, with a row of upper bays 54a, 54a' stacked on top of lower bays 54b, 54b'. Although only two upper bays 54a, 54a' and two lower bays 54b, 54b' are discussed, any number of bays desired may be used without departing from the principles of the present invention. Additionally, it should be understood that the terms "upper" and "lower" as used herein are intended only for convenience of reference with regard to the illustrated embodiment(s) and are not intended to imply any limitation to the manner in which elements can be oriented.

The cage 50 also includes a plurality of upper heat sinks 60 connected to the outer surface of the top 56 of the cage, and a plurality of lower heat sinks 62 connected to the outer surface of the bottom 58 of the cage 50. The placement and configuration of these upper heat sinks 60 and lower heat sinks 62 allow for air to flow both over and under the cage 50, providing balanced cooling for both upper transceiver bays 54a, 54a' and lower transceiver bays 54b, 54b' as discussed below.

The upper heat sinks 60 illustrated in FIG. 3 are configured as pins arranged in multiple rows extending from the rear of the cage 50 to the front of the cage 50 where the transceiver bays 54a, 54a', 54b, 54b' are located. However, other configurations are possible. Each upper heat sink 60 pin is comprised of a suitable conducting metal such as nickel-plated copper, and serves to dissipate heat from the outer surface of the top 56 of the cage 50. The upper heat sink 60 pins illustrated in FIG. 3 are uniformly dispersed along each row of pins, such that air can flow over the outer surface of the top 56 of the cage from the back of the cage 50 to the front of the cage 50 along upper channels 61 formed between the rows of upper heat sink 60 pins.

In this manner, air flowing though the upper channels 61 will flow across the upper heat sink 60 pins, further dissipating the heat conducted up through the top 56 of the cage and into the upper heat sink 60 pins. Additionally, such uniform spacing of the upper heat sink 60 pins in the exemplary embodiment illustrated in FIG. 3 also allows for air flow across the outer surface of the top 56 of the cage in a side 52a to side 52b direction if desired, either in addition to, or instead of, the air flow from back to front of the cage 50.

Although illustrated as uniform rows of upper heat sink 60 pins, in other embodiments the upper heat sinks 60 may be configured in other manners as well. For instance, in some embodiments, the upper heat sink 60 pins may be configured with fewer or more rows of pins; they may be configured as unevenly spaced rows of pins, etc. In yet other embodiments, the upper heat sinks 60 may not be pins at all, but may be substantially solid pieces of some conducting material in order to maximize the upper heat sink 60 surface area. In such embodiments, the upper heat sinks 60 may or may not be configured with apertures to allow air flow in a side 52a to side 52b manner as desired.

In some embodiments, the upper heat sinks 60 may include a mix of pins, substantially solid pieces, and any other desired structure for the upper heat sinks 60, or any combination thereof (such as alternating rows of upper heat sink 60 pins and substantially solid pieces). Similarly, different materials may be used for some, all, or parts of the upper heat sinks 60 as desired, including the use of different materials for different rows of upper heat sink 60 pins, different materials for various pins within each row of the upper heat sink 60 pins, etc.

Additionally, it should be noted that in some embodiments, the upper heat sinks 60, rather than just attaching to the outer surface of the top 56 of the cage, could also extend into the cage 50 an amount sufficient to bring the upper heat sinks 60 into contact with the transceivers or other components (or the housings of such transceivers or other components) inserted into the bays of the cage 50. In such embodiments, the upper heat sinks 60 could directly dissipate the heat from such transceivers or other components, rather than indirectly dissipate such heat by dissipating the heat absorbed by the top 56 of the cage 50. Similarly, the walls of the upper bays 54a, 54a' could also be configured with heat sinks if desired (not shown). Such embodiments would require more spacing between the upper bays 54a, 54a', but would also provide additional direct cooling for each upper bay 54a, 54a'. In such embodiments, the heat sinks attached to the walls of the upper bays 54a, 54a' could be thermally connected to the upper heat sinks 60, through the body of the cage 50, by direct contact from the upper heat sinks 60 extending through the top 56 of the cage 50, or by any other desired method.

Figure 1A:
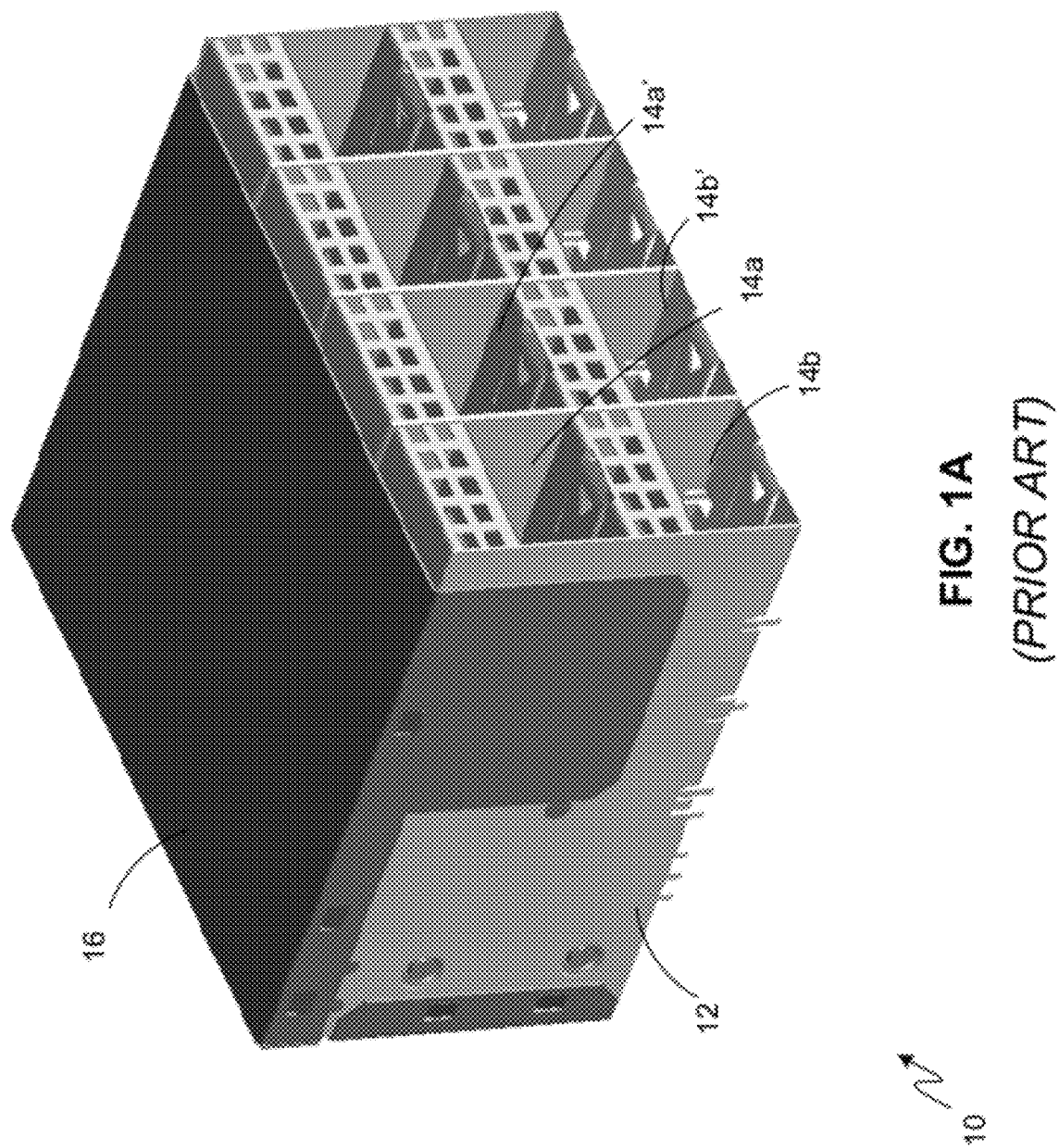
FIG. 1A is a perspective view of a cage for receiving transceivers of a type known in the art.
Figure 1B:
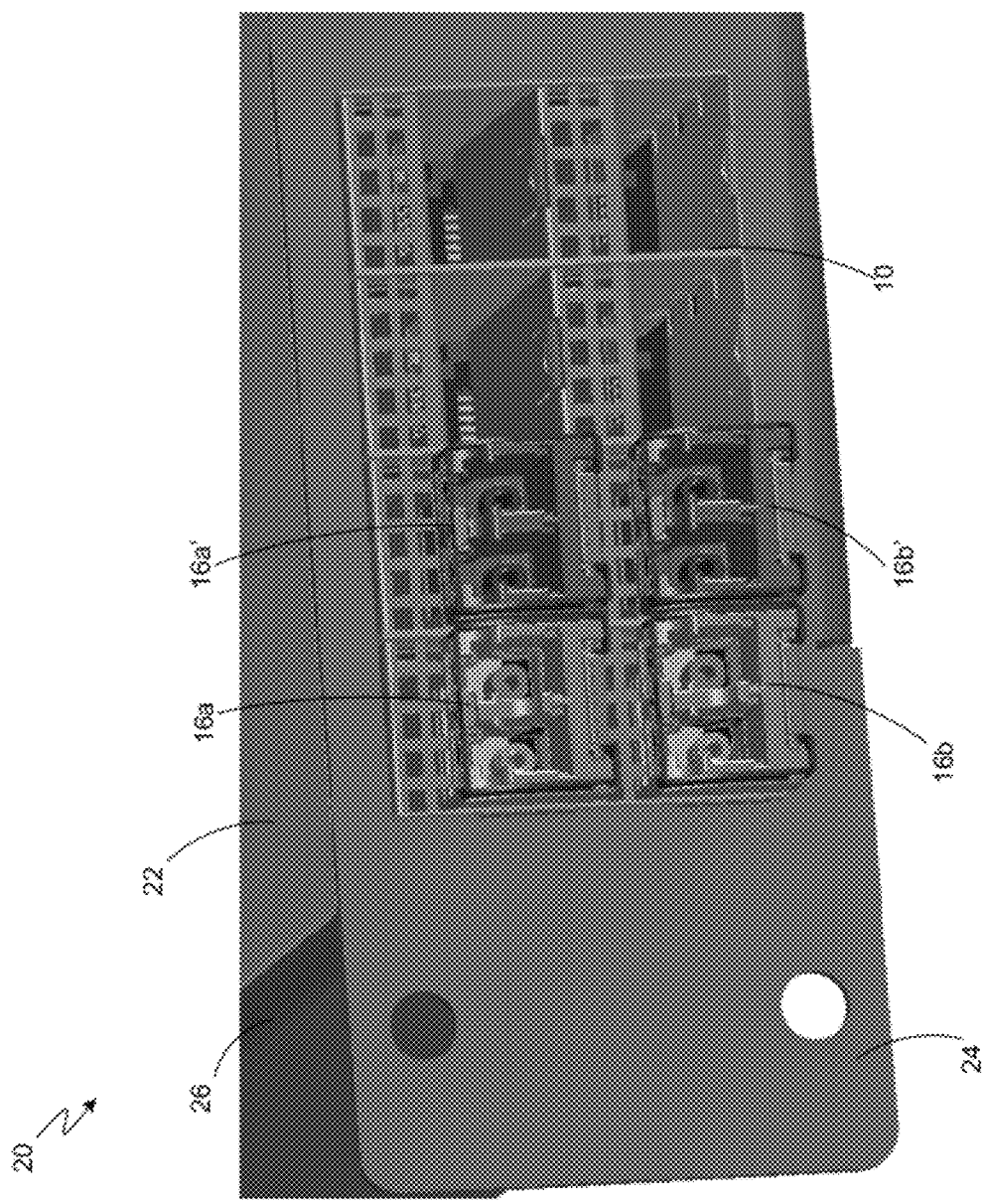
FIG. 1B is a perspective view of a portion of a network switch holding a cage such as that illustrated in FIG. 1A of a type known in the art.
Figure 2:
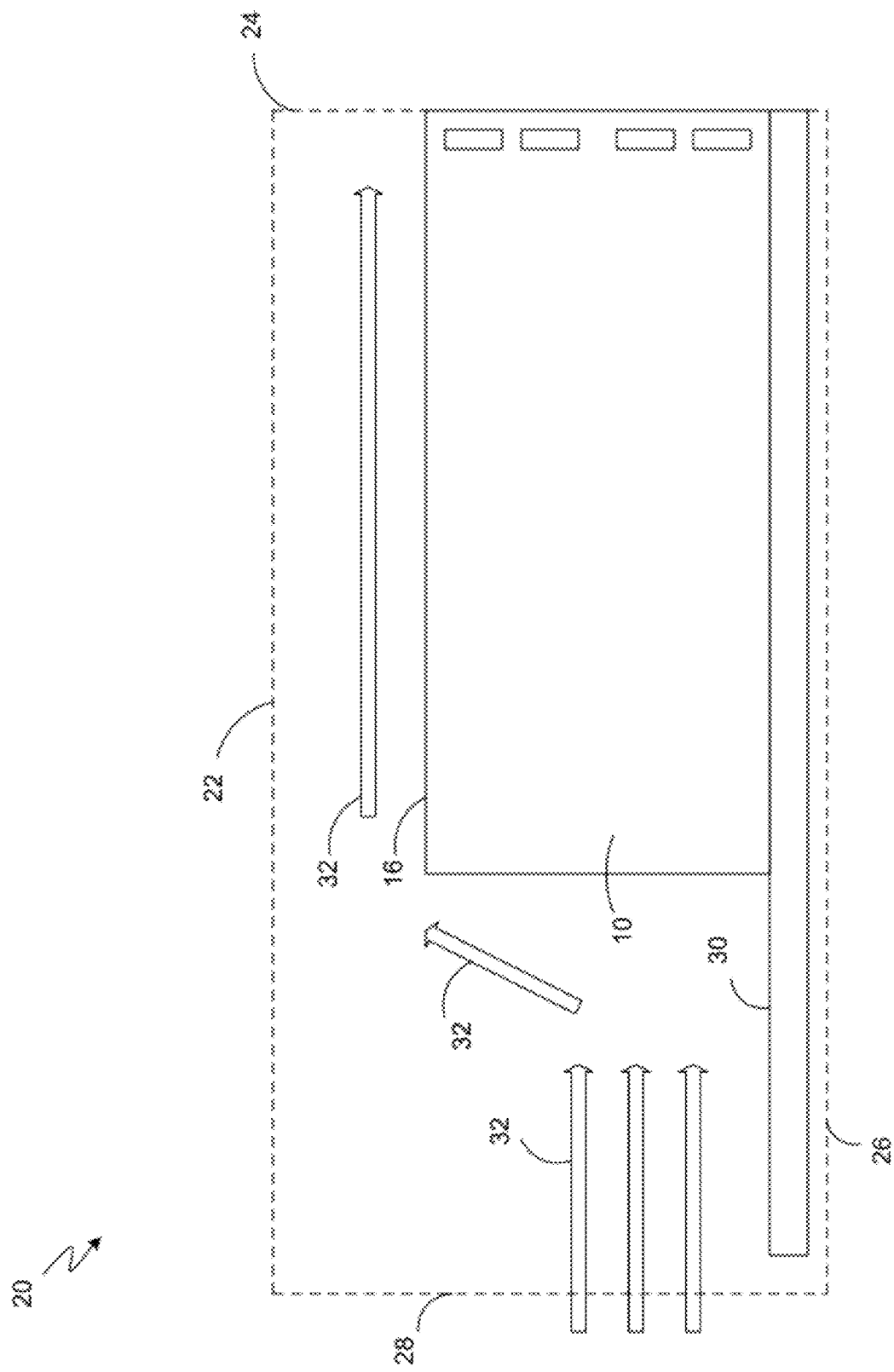
FIG. 2 is a side cut-away view of a network switch, such as that shown in FIG. 1B.

The cage 50 also includes a plurality of lower heat sinks 62 connected to the outer surface of the bottom 58 of the cage 50 to allow heat to be dissipated from the bottom 58 of the cage 50 as well as the top 56 of the cage 50. Unlike prior art cages (see FIG. 1B, 2) where the bottom 58 of the cage 50 is fixed to a substrate 64 (on some embodiments a PCB substrate), the bottom 58 of the cage 50 in the exemplary embodiment illustrated in FIG. 3 is connected to the substrate 64 by the lower heat sinks 62 such that a gap is formed between the bottom 58 of the cage 50 and the substrate 64. This separation allows for air to be blown over the outer surface of the bottom 58 of the cage 10 in a similar manner as discussed above with respect to the top 56 of the cage 50, with a similar cooling effect for the bottom 58 of the cage 10, and accordingly, for the transceivers placed in the lower bays 54b, 54b' of the cage 10.

As with the upper heat sinks 60, the lower heat sinks 62 may allow for air to flow both over and under the cage 50, providing balanced cooling for both upper transceiver bays 54a, 54a' and lower transceiver bays 54b, 54b' as discussed below. The lower heat sinks 62 illustrated in FIG. 3 are configured as heat sink pins arranged in multiple rows extending from the rear of the cage 50 to the front of the cage 50. However, other configurations are possible. Each lower heat sink 62 pin is comprised of a suitable conducting metal such as nickel-plated copper, and serves to dissipate heat from the bottom 58 of the cage 50. The lower heat sink 62 pins illustrated in FIG. 3 are uniformly dispersed along each row of pins, such that air can flow over the outer surface of the bottom 56 of the cage from the back of the cage 50 to the front of the cage 50 along lower channels 63 formed between the rows of lower heat sink 62 pins.

In this manner, air flowing though the lower channels 63 will flow across the lower heat sink 62 pins, further dissipating the heat generated by the transceivers that is conducted down through the bottom 58 of the cage and into the lower heat sink 62 pins. Additionally, such uniform spacing of the lower heat sink 62 pins in the exemplary embodiment illustrated in FIG. 3 also allows for air flow across the outer surface of the bottom 58 of the cage in a side 52a to side 52b direction if desired, either in addition to, or instead of, the air flow from back to front of the cage 50.

Although illustrated as uniform rows of lower heat sink 62 pins, the lower heat sinks 62 may be configured in other manners as well in other embodiments. For instance, in some embodiments, the lower heat sink 62 pins may be configured with fewer or more rows of pins; they may be configured as unevenly spaced rows of pins, etc. In yet other embodiments, the lower heat sinks 62 may not be pins at all, but may be substantially solid pieces of some conducting material to maximize the lower heat sink 62 surface area as desired. In such embodiments, the lower heat sinks 62 may or may not be configured with apertures to allow air flow in a side 52a to side 52b manner as desired.

In some embodiments, the lower heat sinks 62 may include a mix of pins, substantially solid pieces, and any other desired structure for the lower heat sinks 62, or any combination thereof (such as alternating rows of lower heat sink 62 pins and substantially sold pieces). Different materials may also be used for some, all, or parts of the lower heat sinks 62 as desired, including the use of different materials for different rows of lower heat sink 62 pins, different materials for various pins within each row of the lower heat sink 62 pins, etc.

Additionally, it should be noted that in some embodiments, the lower heat sinks 62, rather than just attaching to the outer surface of the bottom 58 of the cage, could also extend into the cage 50 an amount sufficient to bring the lower heat sinks 62 into contact with the transceivers or other components (or the housings of such transceivers or other components) inserted into the bays of the cage 50. In such embodiments, the lower heat sinks 62 could directly dissipate the heat from such transceivers or other components, rather than indirectly dissipate such heat by dissipating the heat absorbed by the bottom 58 of the cage 50. Similarly, the walls of the lower bays 54b, 54b' could also be configured with heat sinks if desired (not shown). Such embodiments would require more spacing between the lower bays 54b, 54b', but would also provide additional direct cooling for each lower bay 54b, 54b'. In such embodiments, the heat sinks attached to the walls of the lower bays 54b, 54b' could be thermally connected to the lower heat sinks 62, through the body of the cage 50, by direct contact from the lower heat sinks 62 extending through the bottom 58 of the cage 50, or by any other desired method.

Figure 4:
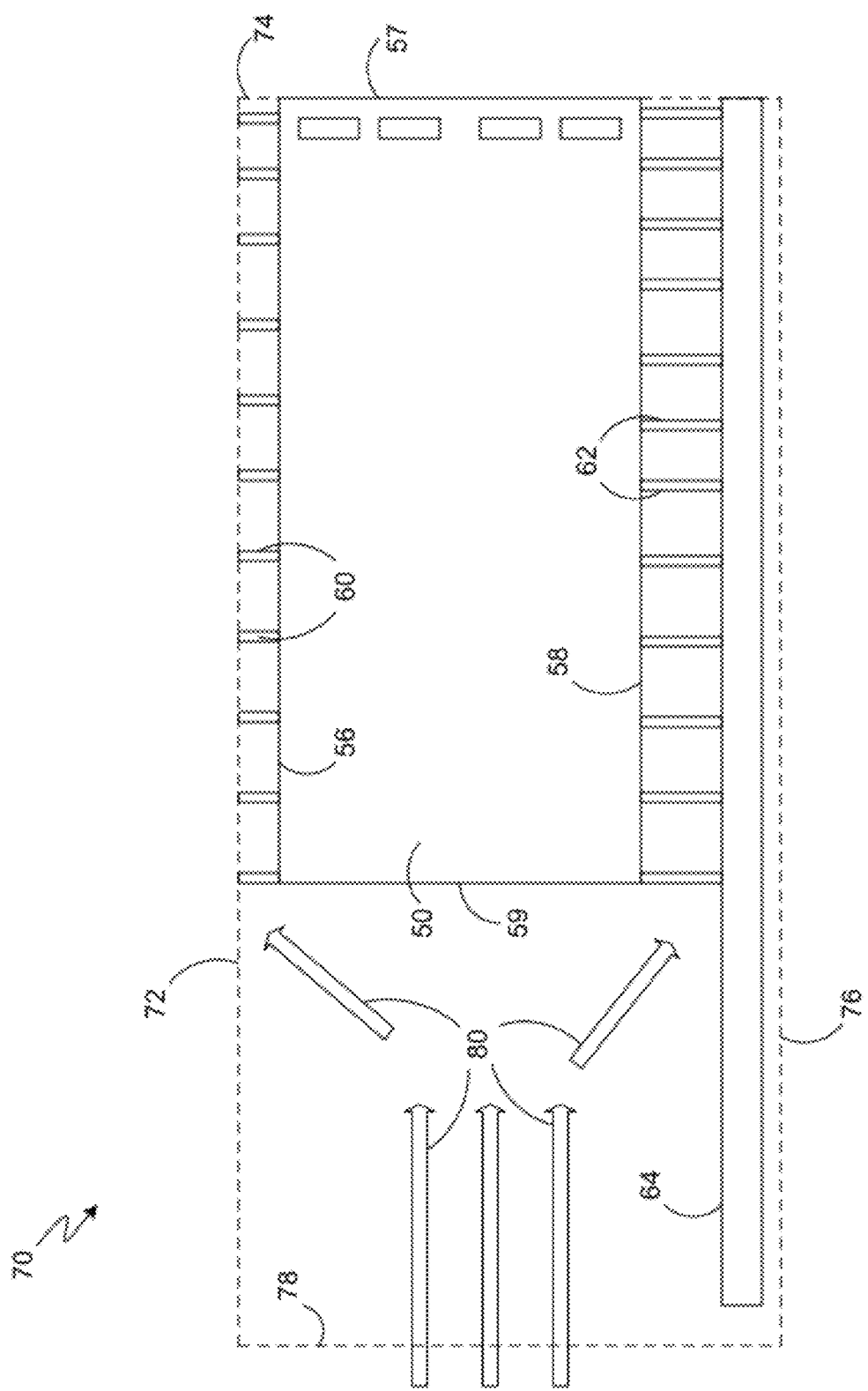
FIG. 4 is a side cut-away view of an exemplary network switch implementing the embodiment of the cage illustrated in FIG. 3.

Turning to FIG. 4, a side cut-away view of an exemplary network switch 70 is illustrated, implementing a cage 50 like that shown in FIG. 3. Although a network switch 70 is illustrated, any suitable electronic device that implements transceivers such as a hub, or other device, may similarly implement a cage 50 such as that illustrated in FIG. 3, and all such electronic devices, or portions thereof that use transceivers or similar components are within the scope of this disclosure.

The exemplary network switch 70 includes a housing with a top 72, a front face 74, a bottom 76 and, optionally, a back panel 78. Additionally, the network switch 70 illustrated in FIG. 4 also includes a cage 50. The cage 50, similar to the embodiment illustrated in FIG. 3, has a housing including a top 56, front 57, bottom 58, and back 59. Connected to the outer surface of the top 56 is a plurality of upper heat sinks 60. The upper heat sinks 60 are connected to the outer surface of the top 56 of the cage in a manner to dissipate heat from the top 56 of the cage 50. Similar to the embodiment illustrated in FIG. 3, the exemplary upper heat sinks 60 illustrated in FIG. 4 are upper heat sink 60 pins arranged in a plurality of rows that run from the back 59 to the front 57 of the cage 50.

Connected to the outer surface of the bottom 58 of the cage are a plurality of lower heat sinks 62. The lower heat sinks 62 are connected to the outer surface of the bottom 58 of the cage in a manner to dissipate heat from the bottom 58 of the cage 50 and in a manner to connect the cage 50 to a substrate 76 such that there is a gap between the outer surface of the bottom 58 of the cage 50 and the upper surface of the substrate 76. In some embodiments, the substrate 76 will be a PCB substrate 76. In such embodiments, one or more of the lower heat sink 62 pins may configured and located to communicatively connect the cage 50 to the PCB substrate 76 such that transceivers or other elements inserted into the cage 50 may be in communication with and/or exchange signals or current with other elements or components attached or connected to the PCB substrate 76 (not shown).

Similar to the embodiment illustrated in FIG. 3, the exemplary lower heat sinks 62 illustrated in FIG. 4 are lower heat sink 62 pins arranged in a plurality of rows that run from the back 59 to the front 57 of the cage 50. In the exemplary embodiment illustrated in FIG. 4, the lower heat sink 62 pins are longer in length than the upper heat sink 60 pins to allow more cooling to take place at the bottom 58 of the cage 50.

One advantage to using longer lower heat sink 62 pins is to provide greater cooling to any transceivers or other components that may be inserted into the lower bays 54b, 54b' (see FIG. 3), which typically have higher operating temperatures than transceivers or components inserted into the upper bays 54a, 54a' (see FIG. 3) of stacked-cage designs such as cage 50. However, in other embodiments the upper heat sink 60 pins could be equal to, or longer than the lower heat sink 62 pins. Similarly, in some embodiments the lower heat sink 62 pins could be made of different material than the upper heat sink 60 pins to allow one set of heat sink 60, 62 pins to dissipate more heat than the other set or dissipate heat at a different rate than the other set if desired.

In other embodiments, the upper heat sinks 60 and lower heat sinks 62 of the cage 50 illustrated in FIG. 4 may not be pins, but instead may be substantially solid pieces of some conducting material to maximize the heat sink surface area as desired. In such embodiments, upper and/or lower heat sinks 60, 62 may or may not be configured with apertures to allow air flow in a side 52a to side 52b manner as desired (not shown). Similarly, in some embodiments, the upper and/or lower heat sinks 60, 62 may include a mix of pins, substantially solid pieces, and any other desired structure for the heat sinks, or any combination thereof (such as alternating rows of heat sink pins and substantially sold pieces).

Additionally, although the lower heat sinks 62 may serve to attach the bottom 58 of the cage 50 to the substrate 76, it may not be desirable in some embodiments for heat to be dissipated from the bottom 58 of the cage 50, through the lower heat sinks 62, and into the substrate 76. In such embodiments, the substrate 76 may be a nonconductive material and/or a layer of nonconductive material may be placed between the ends of the lower heat sinks 62 and the upper surface of the substrate 76 as desired or needed to prevent discharge of the heat from the bottom 58 of the cage 50 into the substrate 76.

As illustrated in FIG. 4, the upper heat sinks 60 are connected at one end to the outer surface of the top 56 of the cage 50, while the other end of upper heat sinks 56 may be connected to, or in close proximity to, the inner surface of the top 72 of the network switch 70. It may not be desirable for heat to be dissipated from the top 56 of the cage 50, through the upper heat sinks 60, and into the top 72 of the network switch 70. In such embodiments, the top 72 of the network switch 70 may be a nonconductive material and/or a layer of nonconductive material may be placed between the ends of the upper heat sinks 60 and the inner surface of the top 72 of the network switch 70 (such as by adhering a layer of nonconductive material to the inner surface of the top 72 of the network switch 70 for example). In other embodiments, there may be a gap or air space between the upper ends of the upper heat sinks 60 and the top 72 of the network switch 70 such that a nonconductive material is not needed.

In use, blown air 80 can enter the network switch 70 through apertures, holes, or other openings in the back panel 78 of the network switch 70 and pass both over the top 56 and the bottom 58 of the cage 50. In some embodiments, the network switch 70 may not have a back panel 78 at all, allowing free flow of the blown air 80 into the network switch 70. The blown air 80 passing between rows of the upper heat sink 60 pins and lower heat sink 62 pins (see FIG. 3) causes greater heat dissipation from the top 56 and bottom 58 of the cage 50 than would occur without the upper heat sink 60 pins. This in turn acts to provide greater cooling to transceivers or other components inserted into the cage 50, especially for densely packed small form factor transceivers used in high speed communications systems, including optical transceivers in various form factors, such as SFF, SFP+, QSFP, XFP, etc.

Additionally, implementing the lower heat sinks 62, and in some embodiments, by selectively configuring the size or material of the lower heat sinks 62 in comparison to the upper heat sinks 60, the lower bays 54b, 54b' can receive a similar cooling effect to that of the upper bays 54a 54a' in a stacked-cage embodiment of the cage 50. This provides better matching between the heat levels of the upper bays 54a, 54a' and the lower bays 54b, 54b', allowing for easier monitoring of the heat in the cage 50. For example, if it is known that implementing a lower heat sink 62, or a particular lower heat sink 62 configuration, causes the lower bays 54b, 54b' to consistently stay within a few degrees of the upper bays 54a, 54a', only one set of bays would need to monitored to ensure that the maximum desired heat was not exceeded for efficient operation of the transceivers inserted into all of the bays.

Figure 5:
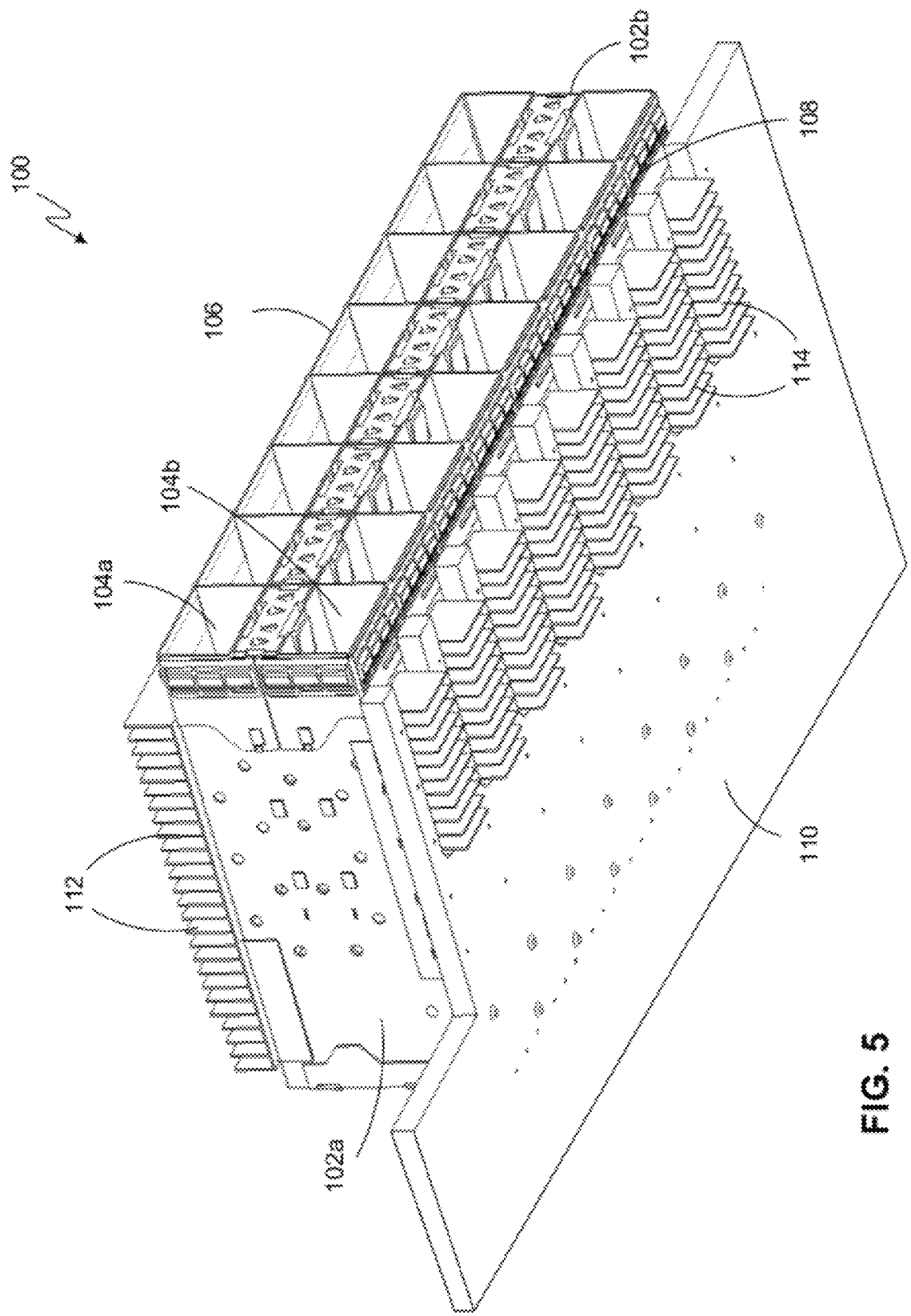
FIG. 5 is perspective view of another exemplary embodiment of a cage for receiving transceivers that allows for balanced cooling.

Turning to FIG. 5, a perspective view of another exemplary embodiment for the cage 100 is illustrated. As shown in FIG. 5, a cage 100 may include a housing with sides 102, 102b, a top 106 and bottom 108. The front of the cage 100 includes a plurality of openings or bays 104a, 104b arranged in two rows comprising upper bays 104a stacked on top of lower bays 104b. Again, although only one upper bay 104a and one lower bay 104b are discussed herein for convenience, any number of desired upper bays 104a or lower bays 104b may be used in the stacked-cage configuration of the cage 100 illustrated in FIG. 5. As shown in FIG. 5, each bay 104a, 104b has a generally rectangular opening corresponding to the profile of the optical transceiver or other component which the cage is configured to receive.

As shown in FIG. 5, each bay 104a, 104b has a generally rectangular opening corresponding to the profile of an exemplary optical transceiver. As would be understood by one of skill in the art, the exemplary bays 104a, 104b shown in FIG. 5 are generally rectangular to correspond to an exemplary SFP optical transceiver; however, if a different type of transceiver was used other than an optical transceiver, or if a different form factor of optical transceiver (such as SFF, SFP+, QSFP, XFP, etc.) was intended for use with the cage 100, the shape and configuration of the bays 104a, 104b (and cage 100) may correspondingly change and would still fall within the scope of the present invention.

In the embodiment illustrated in FIG. 5, upper heat sinks 112 are attached to the outer surface of the top 106 of the cage 100 so as to dissipate heat from the top 106 of the cage 100. The upper heat sinks 112 shown in FIG. 5 are not pins, but are instead generally square or rectangular in shape, providing more surface area for heat dissipation. These upper heat sinks 112 are arranged in a plurality of rows beginning at the back of the cage 100 and extending to the front. However, due to the shape of these exemplary upper heat sinks 112, air flow from the back of the cage 100 over the top 106 of the cage 100 is difficult. Instead, air flow from side 102a to side 102b will pass between the upper heat sinks 112 and flow across the surface of the upper heat sinks 112, dissipating heat from the top 106 of the cage.

Similarly, the embodiment illustrated in FIG. 5, also includes a plurality of lower heat sinks 114 attached to the outer surface of the bottom 108 of the cage 100. Unlike the previously discussed embodiment for the cage 50 (see FIGS. 3-4) the lower heat sinks 114 of the embodiment of the cage 100 illustrated in FIG. 5 are not located between the outer surface of the bottom 108 of the cage 100 and the upper surface of a substrate 110. Instead, the embodiment illustrated in FIG. 5 has the bottom 108 of the cage 100 affixed directly to the substrate 110. The lower heat sinks 114 located in cut-outs of the substrate 110 and extend down from the bottom 108 of the cage 100 and past the bottom surface of the substrate 110.

These lower heat sinks 114 are also illustrated as generally square or rectangular in shape, providing more surface area for heat dissipation. The lower heat sinks 114 of FIG. 5 are arranged in a plurality of rows beginning at the middle of the bottom 108 of the cage 100 and extending to the front. Again, to the shape of these lower heat sinks 114, air flow from the back of the cage 100 over the bottom 108 of the cage 100 is difficult. Instead, air flow from side 102a to side 102b will pass between the lower heat sinks 114 and flow across their surfaces, dissipating heat from the bottom 108 of the cage.

Figure 6:
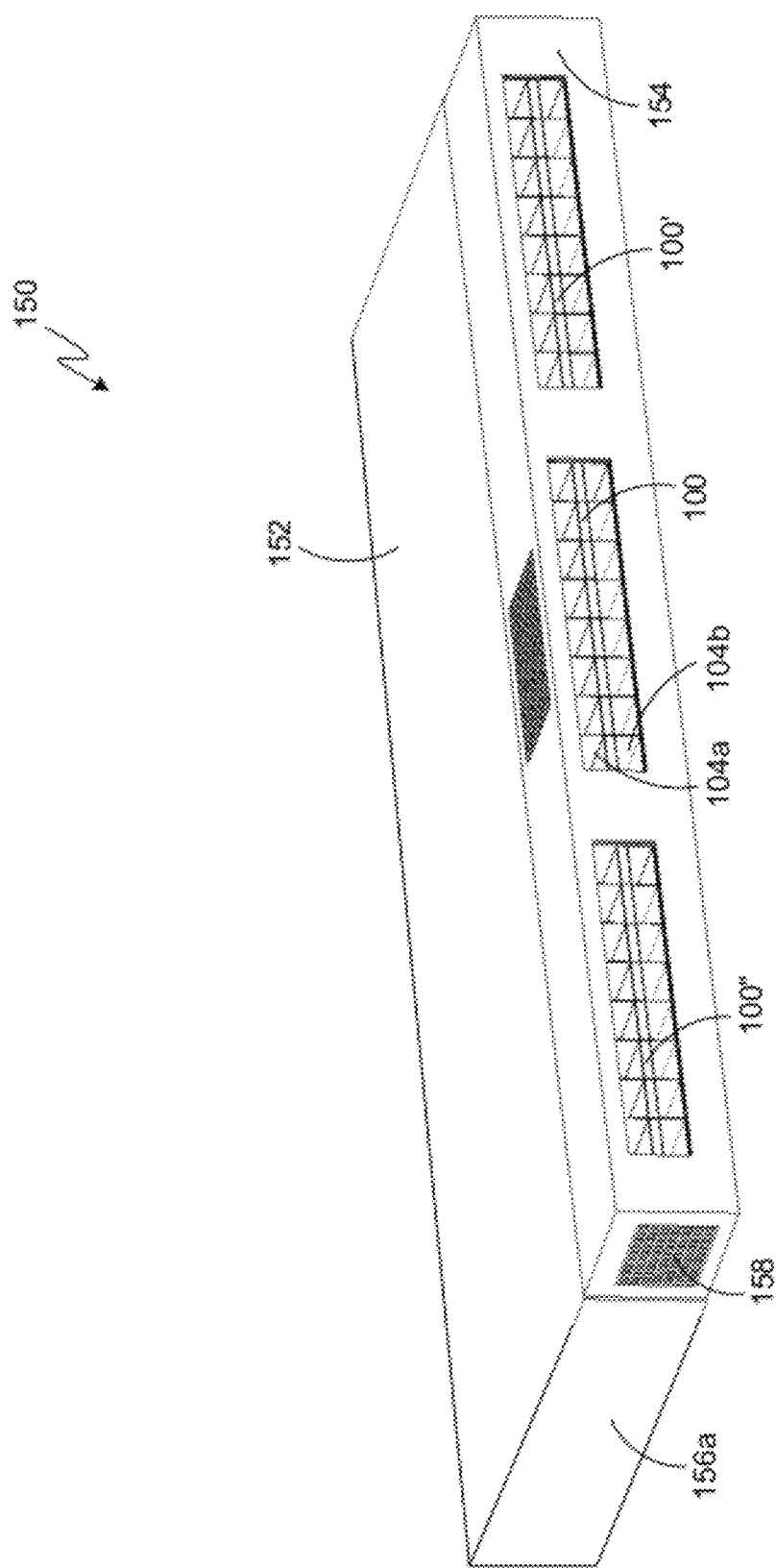
FIG. 6 is a perspective view of an exemplary network switch implementing the embodiment of the cage illustrated in FIG. 5.

One advantage of the embodiment of the cage 100 shown in FIG. 5 is the ease with which such embodiment may be fitted into conventional systems, such as the network switch 150 illustrated in FIG. 6. FIG. 6 illustrates a standard network switch 150 housing with a top 152, a front 154, and sides 156a, 156b (156b not shown in view of network switch 150 illustrated in FIG. 6). Rather than having to alter the housing of the network switch 150, three cages 100, 100', 100" similar to that illustrated in FIG. 5 can be inserted into the housing of the network switch 150. The three cages 100, 100', 100" are stacked-cage configurations, each with two rows of eight bays 104a, 104b arranged with a row of eight upper bays 104a stacked on top of each corresponding lower bays 104b.

In the exemplary embodiment illustrated in FIG. 6, the sides 156a, 156b of the network switch 150 housing may be fitted with slots 158a, 158b (not shown in view of network switch 150 illustrated in FIG. 6) or other apertures that allow air to be blown into one side 156a of the network switch 150, across the upper heat sinks 112 and lower heat sinks 114 of each of the cages 100, 100', 100" and out the other side 156b of the network switch 150. Thus, the benefits of the balanced cooling of both the upper bays 104a and lower bays 104b of each cage 100, 100', 100" may still be accomplished using existing network switches 150 (or other similar systems or equipment that uses cages to receiver transceivers or other electrical or opto-electrical components). As discussed above, the size, shape, materials and/or configurations of the upper heat sinks 112 and lower heat sinks 114 may varied in different embodiments as desired.

It should be noted that this disclosure has been presented with reference to one or more exemplary or illustrative embodiments for the purpose of demonstrating the principles and concepts of the invention. The invention is not limited to these embodiments. Additionally, the word "exemplary" is used herein to mean "serving as an example, instance, or illustration." Any aspect described herein as "exemplary" is not necessarily to be construed as preferred or advantageous over other aspects. As will be understood by persons skilled in the art, in view of the description provided herein, many variations may be made to the embodiments described herein. Therefore, although selected aspects have been illustrated and described in detail, it will be understood that various substitutions and alterations may be made therein without departing from the spirit and scope of the present invention, as defined by the following claims.

What is claimed is:

1. An electrical system, the electrical system comprising:
   a cage with a top, front, and bottom;
   a plurality of upper bays disposed in the front of the cage, each of the plurality of upper bays configured to receive a transceiver;
   a plurality of lower bays disposed in the front of the cage, each of the plurality of lower bays configured to receive a transceiver, wherein each of the plurality of upper bays is stacked on one of the plurality of lower bays;
   an upper heat sink extending from the outer surface of the top of the cage; and
   a lower heat sink extending from the outer surface of the bottom of the cage.

2. The electrical system of claim 1 wherein the upper heat sink comprises a plurality of heat sinks extending from the outer surface of the top of the cage.

3. The electrical system claim 2 wherein the plurality of upper heat sinks further comprises a plurality of heat sink pins.

4. The electrical system of claim 2 wherein the plurality of upper heat sinks further comprises rectangular heat sinks.

5. The electrical system of claim 2 wherein the plurality of upper heat sinks are arranged in rows to allow air flow across the outer surface of the top of the cage.

6. The electrical system of claim 1 wherein the lower heat sink comprises a plurality of heat sinks extending from the outer surface of the bottom of the cage.

7. The electrical system of claim 6 further comprising a substrate attached to at least one of the plurality heat sinks extending from the outer surface of the bottom of the cage such that the at least one of the plurality of heat sinks is disposed between the upper surface of the substrate and the outer surface of the bottom of the cage.

8. The electrical system of claim 6 wherein the plurality of lower heat sinks further comprises rectangular heat sinks.

9. The electrical system of claim 6 wherein the plurality of lower heat sinks further comprises heat sink pins.

10. The electrical system of claim 6 wherein the plurality of lower heat sink pins are arranged in rows to allow air flow across the outer surface of the bottom of the cage.

11. The electrical system of claim 1, further comprising an additional heat sink, the additional heat sink attached to a wall of at least one of the plurality of upper bays or a wall of at least one of the plurality of lower bays.

12. A cage for use in an electrical system, the cage comprising:
    a housing with a back, a top, a front, and a bottom;
    a plurality of upper bays disposed in the front of the housing, each of the plurality of upper bays configured to receive a transceiver;
    a plurality of lower bays disposed in the front of the housing, each of the plurality of lower bays configured to receive a transceiver, wherein the plurality of upper bays is stacked on the plurality of lower bays;
    a plurality of upper heat sinks extending from the outer surface of the top of the housing; and
    a plurality of lower heat sinks extending from the outer surface of the bottom of the housing.

13. The cage of claim 12 further comprising a substrate, where at least one of the plurality of lower heat sinks is disposed between an upper surface of the substrate and the outer surface of the bottom of the housing.

14. The cage of claim 12 further comprising a substrate attached to the outer surface of the bottom of the housing, wherein the plurality of lower heat sinks extend through apertures in the substrate.

15. A cage for use in an electrical system, the cage comprising:
    a housing with a back, a top, a front, and a bottom;
    a plurality of upper bays disposed in the front of the housing, each of the plurality of upper bays configured to receive a transceiver;
    a plurality of lower bays disposed in the front of the housing, each of the plurality of lower bays configured to receive a transceiver, wherein the plurality of upper bays is stacked on the plurality of lower bays;
    a plurality of upper heat sinks connected to the outer surface of the top of the housing, wherein at least one of the plurality of upper heat sinks is connected to the outer surface of the top of the housing in a manner to extend through the top of the cage such that the at least one of the plurality of upper heat sinks may dissipate heat directly from a transceiver inserted into one of the plurality of upper bays; and a plurality of lower heat sinks connected to the outer surface of the bottom of the housing.

16. The cage of claim 15 wherein at least one of the plurality of lower heat sinks is connected to the outer surface of the bottom of the housing in a manner to extend through the bottom of the cage such that the at least one of the plurality of lower heat sinks may dissipate heat directly from a transceiver inserted into one of the plurality of lower bays.

17. A method of balanced cooling, the method comprising:

providing a cage with a front, top, and bottom, the front of the cage containing a plurality of bays for receiving transceivers;

providing a plurality of upper heat sinks extending from the outer surface of the top of the cage;

providing a plurality of lower heat sinks extending from the outer surface of the bottom of the cage; and blowing air across the outer surface of the top of the cage and the outer surface of the lower of the cage.

18. The method of claim 17 further comprising providing a substrate, wherein the plurality of lower heat sinks is disposed between an upper surface of the substrate and the outer surface of the bottom of the cage.

19. The method of claim 17 wherein the step of blowing air further comprises blowing air from the back of the cage to the front of the cage.

20. The method of claim 17 wherein the step of blowing air further comprises blowing air from one side of the cage to the other side of the cage.

\* \* \* \* \*